United States Patent
Hirai

(10) Patent No.: US 7,048,368 B2
(45) Date of Patent: May 23, 2006

(54) INK-JET IMAGE FORMING METHOD

(75) Inventor: Yoko Hirai, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/618,294

(22) Filed: Jul. 11, 2003

(65) Prior Publication Data

US 2004/0036753 A1    Feb. 26, 2004

(30) Foreign Application Priority Data

Aug. 26, 2002  (JP) ............... 2002-245013

(51) Int. Cl.
*B41J 2/01*    (2006.01)

(52) U.S. Cl. .................... 347/102; 347/101
(58) Field of Classification Search ............. 347/102, 347/101, 100, 103, 95, 96; 34/304, 1; 101/488; 219/216
See application file for complete search history.

(56) References Cited

U.S. PATENT DOCUMENTS

| | | | | | |
|---|---|---|---|---|---|
| 5,568,173 | A | * | 10/1996 | Leenders et al. | 347/102 |
| 5,864,354 | A | * | 1/1999 | Hibino et al. | 347/212 |
| 5,889,084 | A | * | 3/1999 | Roth | 523/161 |
| 6,092,890 | A | * | 7/2000 | Wen et al. | 347/101 |
| 6,095,050 | A | * | 8/2000 | Figov | 347/102 |
| 6,312,123 | B1 | * | 11/2001 | Codos et al. | 347/102 |
| 6,457,823 | B1 | * | 10/2002 | Cleary et al. | 347/102 |
| 6,530,657 | B1 | * | 3/2003 | Polierer | 347/102 |
| 6,554,414 | B1 | * | 4/2003 | Ylitalo et al. | 347/102 |
| 2003/0231234 | A1 | * | 12/2003 | Ushirogouchi et al. | 347/100 |

* cited by examiner

*Primary Examiner*—Manish S. Shah
(74) *Attorney, Agent, or Firm*—Frishauf, Holtz, Goodman & Chick, P.C.

(57) ABSTRACT

An ink-jet image forming method including: jetting ultraviolet ray-curable ink from an ink-jet head onto a recording substrate while conveying the recording substrate; and exposing the jetted ink on the recording substrate to ultraviolet rays irradiated by an ultraviolet ray-emitting light source, wherein in the exposing step, a surface temperature of the ultraviolet ray-emitting light source is not more that 60° C.

7 Claims, 2 Drawing Sheets

INK-JET IMAGE FORMING METHOD

TECHNICAL FIELD

The present invention relates to an ink-jet image forming method, especially, to an ink-jet image forming method utilizing ultraviolet ray-curable ink and a specific ultraviolet ray-emitting light source.

BACKGROUND

An ink-jet image forming method utilizing ultraviolet ray-curable ink, which can be hardened by an irradiation of an ultraviolet ray, is remarked from the reasons like that there is no limitation of the recording material to be printed thereon, it is superior in the light resistibility, and it is superior in the working safety because the solvent is not included.

In the conventional image forming method, the ink-jet ink has been hardened by a light source such as a high pressure mercury lamp after jetted. However, since the light source generates heat as well as light, problems such like shrinkage of a recording substrate occur when a substrate, which is poor in heat resistance, such as a thermal-shrinkage film, is used as the recording substrate. When the light is emitted onto the recording substrate with keeping a distance between the light source and the recording substrate to respond above-described problems, demerits such as an increase of running cost arise due to a deterioration of energy efficiency.

Further, it is preferable to irradiate the ultraviolet ray as soon as possible after the arrival of the ultraviolet ray-curable ink on the recording substrate to inhibit a bleeding of the formed image. Thus, in the ink-jet printing, the closer the light source to the ink-jet head, the better in this viewpoint. However, if the light source is installed near the ink-jet head, a nozzle clogging is occurred due to the heat of the light source, and the stable printing becomes difficult.

SUMMARY OF THE INVENTION

An aspect of the invention is to provide an ink-jet image forming method utilizing an ultraviolet ray-emitting light source, which is especially suitable for ink-jet printing, and the method being capable of inhibiting the shrinkage of the recording substrate and being excellent in energy efficiency.

The above-mentioned aspects can be achieved by following structures.

One of a structure of the present invention is an ink-jet image forming method comprising: jetting ultraviolet ray-curable ink from an ink-jet head onto a recording substrate while conveying the recording substrate; and exposing the jetted ink on the recording substrate to ultraviolet rays irradiated by an ultraviolet ray-emitting light source, wherein in the exposing step, a surface temperature of the ultraviolet ray-emitting light source is not more than 60° C.

In the ink-jet image forming method, it is preferable that the ink-jet head is a line-shape ink-jet head installed in a perpendicular direction to a conveying direction of the recording substrate, and the ultraviolet ray-emitting light source is a ultraviolet ray-emitting tube, which is longer than the line-shape ink-jet head, and is fixed at a downstream position of the ink-jet head and in the perpendicular direction of the conveying direction of the recording substrate.

In the ink-jet image forming method, it is also preferable that the ultraviolet ray-curable ink is jetted onto the recording substrate while the ink-jet head being moved by a carriage in a perpendicular direction of the conveying direction of the recording substrate, and the ultraviolet ray-emitting light source is installed on the carriage.

In the ink-jet image forming method, the distance between a surface of the ultraviolet ray-emitting light source and the recording substrate is preferably from 0.1 mm to 100 mm.

In the ink-jet image forming method, it is preferable that the exposing step is started in at most 1 second, more preferably in 0.0005 to 1 second after an arrival of the jetted ultraviolet ray-curable ink to the recording substrate.

In the ink-jet image forming method, the ultraviolet ray-emitting light source is preferably a fluorescent light source comprising a fluorescent material.

In the ink-jet image forming method, it is preferable that plural ultraviolet ray-emitting light sources, which have different peak wavelengths from each other, are used in the exposing step.

In the ink-jet image forming method, the ultraviolet ray-curable ink preferably comprises a cationic polymerization initiator and a cationic polymerizable monomer.

DETAILED DESCRIPTION OF THE INVENTION

Figure 1:
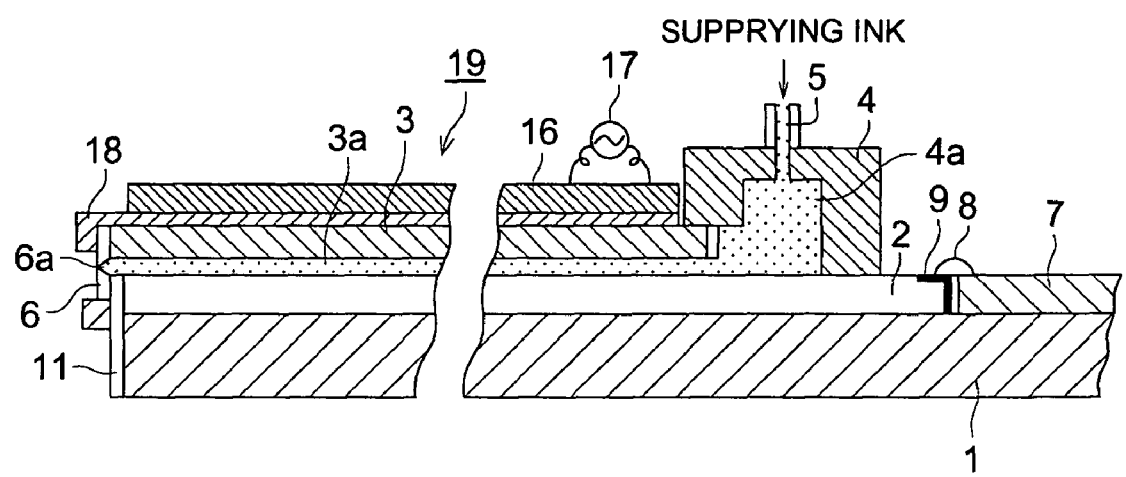
FIG. 1 is a structural sectional view of an ink-jet head, which can be used in the invention.

Hereinafter, the present invention will be detailed.

Ink-jet head (hereinafter, also referred to as merely a head)

A publicly known ink-jet head can be used for the ink-jet head used in the present invention.

For example, a continuous type or dot on demand type ink-jet head can be used.

Among the dot on demand type ink-jet heads, a thermal head, which has an operating valve for jetting as described in JP-A No. H9-323420, is preferable.

As a piezoelectric heads, the heads as disclosed in, for example, EP-A-0277703, EP-A-0278590, U.S. Pat. No. 4,879,568, U.S. Pat. No. 4,887,100 or U.S. Pat. No. 5,028,936 also are preferably used. In the ink-jet head, it is preferable that the head has a temperature control function so that the temperature of the ink can be controlled. It is preferable that a jetting temperature is set so that the viscosity at the jetting is 5–25 mPa·s, and the ink temperature is controlled so that the variation width of the viscosity is within ±5%. It is operated at the drive frequency of 5–500 kHz.

In the ink-jet image forming method of the invention, ultraviolet ray-curable ink, which can be cured by a radiation of ultraviolet rays, is jetted onto a recording substrate. Then, the recording substrate is exposed to ultraviolet rays irradiated by an ultraviolet ray-emitting light source, which has a surface temperature of not more than 60° C., so as to form a fixed ink-jet image.

Further, in the ink-jet image forming method of the invention, it is preferable that the ink-jet head is a line-shape ink-jet head installed in a perpendicular direction to a conveying direction of the recording substrate, and the ultraviolet ray-emitting light source is a ultraviolet ray-emitting tube, which is longer than a length of the ink-jet head, and is fixed at a downstream position of the ink-jet head and in the perpendicular direction of the conveying direction of the recording substrate.

Further, in the ink-jet image forming method of the invention, it is also preferable that the ultraviolet ray-curable ink is jetted on to the recording substrate while the ink-jet head being moved by a carriage in a perpendicular direction of the conveying direction of the recording substrate, and the ultraviolet ray-emitting light source is installed on the carriage.

Ultraviolet ray-emitting light source (hereinafter, also referred to as merely a light source)

As a ultraviolet ray-emitting light source, such as a cold-cathode tube or a hot-cathode tube, which generates a fluorescent light by colliding of discharged electrons to a tube on which a fluorescent material are coated, LED (Light Emitting Diode), or LD (Laser Diode) are preferably used in the invention.

Further, as the ultraviolet ray-emitting light source, a fluorescent light source comprising a fluorescent material is preferably used.

As the fluorescent material, for example, a compound represented by the following Formula (I) is preferred.

Formula (1)

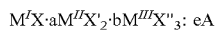

wherein $M^I$ is an alkaline metal atom selected form the group consisting of Li, Na, K, Rb and Cs; $M^{II}$ is a divalent metal atom selected from the group consisting of Be, Mg, Ca, Sr, Ba, Zn Cd and Ni; $M^{III}$ is a trivalent metal atom selected from the group consisting of Sc, Y, La, Ce, Pr, Nd, Pm, Sm Eu, Gd, Tb, Dy, Ho, Er, Tm Yb, Lu, Al, Ga and In; each of X, X' and X" is a halogen atom selected from the group consisting of F, Cl, Br and I; A is a metal atom selected from the group consisting of Eu, Tb, In, Ce, Tm, Dy, Pr, Ho, Nd, Yb, Er, Gd, Lu, Sm, Y, Tl, Na, Ag, Cu and Mg; and each of a, b, and e is a numeral within a range of $0 \leq a \leq 0.5$, $0 \leq b < 0.5$, and $0 < e \leq 0.2$, respectively.

The photostimulable fluorescent material represented by the above-mentioned Formula (I) can be prepared, for example, by a preparing method described below.

As a fluorescent raw material, (a) one kind of or two or more kinds of compounds selected from the group consisting of NaF, NaCl, NaBr, NaI, KF, KCl, KBr, KI, RbF, RbCl, RbBr, RbI, CsF, CsCl, CsBr and CsI can be used;

(b) one kind of or two or more kinds of compounds selected from $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2.2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$, and $NiI_2$ can be used;

(c) a compound comprising a metal selected from the group consisting of Eu, Tb, In, Cs, Ce, Tm, Dy, Pr, Ho, Nd, Yb, Er, Gd, Lu, Sm, Y, Tl, Na, Ag, Cu and Mg can be used.

In the compound represented by Formula (I), a is preferably $0 \leq a < 0.5$, more preferably $0 \leq a < 0.01$, b is preferably $0 \leq b < 0.5$, more preferably $0 \leq b \leq 0.01$, and e is $0 < e \leq 0.2$, more preferably $0 < e \leq 0.1$.

The fluorescent raw materials, above-mentioned (a) to (c), are checkweighed so as to satisfy the above-mentioned mixing ratio, and then, are completely mixed by utilizing a mortar, a ball mill or a mixer mill.

As well, the luminous efficiency of the fluorescent material can be raised by the following method: firing the mixed fluorescent material under a predetermined condition in an electric furnace; pulling out the fired fluorescent material from the electric furnace and crushing it; putting the crushed fluorescent material into the electric furnace while the fluorescent material filled in a heat-proof vessel; and firing the fluorescent material again in the predetermined condition. Further, when the fired fluorescent material is cooled to the room temperature, the desired fluorescent material can be obtained by pulling out the fluorescent material from the electric furnace and leaving it in the air. The fluorescent material can be cooled in a little reducing atmosphere or in a neutral atmosphere as well as the firing condition. Still further, the luminous efficiency by the photo stimulation of the obtained fluorescent material can be raised by cooling the fired fluorescent material rapidly in a little reducing atmosphere or in a neutral atmosphere by moving the fired fluorescent material from a heating section to a cooling section in the electric furnace.

As the ultraviolet ray-emitting light source used in the invention, it is preferable that plural ultraviolet ray-emitting light sources, which have different peak wavelengths from each other, are used.

As the ultraviolet ray-emitting light source, a fluorescent lamp described in Japanese Unexamined Patent Application Publication No. H05-305259 can be used.

As a preferable exposing method in the present invention, a method is preferable in which the rod-like light source (a ultraviolet ray-emitting tube) is laid in the direction perpendicular to the conveying direction of the recording substrate, and by which the ultraviolet rays are radiated at a predetermined timing after the arrival of the ink on the recording substrate.

In the invention, it is preferable that the exposing step is started in at most 1 second, more preferably 0.0005 to 1 second, after an arrival of the jetted ultraviolet ray-curable ink to the recording substrate.

By controlling the timing for radiation, the distance between the nozzle and light source may be appropriate to avoid the head contamination by the sublimation material generated by the hardening, or the nozzle choking by the light reflection. Further becoming larger fluctuation in the shape of dot depending on the recording material can be prohibited and the stable image quality can be obtained.

In case of the exposing method in which there is the slope of the illumination intensity at the exposed portion, the time from the arrival of ink to exposing is measured by making the time point at which the illumination intensity more than ⅒ of the maximum illumination intensity is obtained, as the exposing start time.

In the invention, the distance between a surface of the ultraviolet ray-emitting light source and the recording substrate is preferably from 0.1 mm to 100 mm, more preferably 0.5 mm to 50 mm. By controlling the distance in this range, danger of breakage of the light source by a contact with the recording substrate can be decreased, an excellent luminous efficiency can be obtained, and it is not necessary to increase the number of lamp to obtain suffice light intensity and to grow in the size of the apparatus.

Recording Substrate

There is no particular limitation for the recording substrate used in the present invention. As a preferable recording substrate, a so-called no-absorptive substrate having no ink absorbing ability can be used. The no-absorptive material does not absorb ink by a fabric material such as paper, and does not have a resin layer, which absorbs the ink and is swollen, or a porous layer, which is provided by utilizing a filler and resin particles, on a film as an ink absorptive layer. As a specifically preferable recording substrate, a paper on whose surface the resin is coated, plastic film, plastic sheet, metal, ceramic, or glass, is listed.

Ink

The publicly known ultraviolet ray-curable composition can be used as the ink curable by the radiation of the ultraviolet ray in the present invention. For example, the mixture of the photo-radical generator and radical polymerizable compound, or the mixture of the photo-cation initiator and cationic polymerizable compound is used. Specifically, the ink described in JP-A Nos. H3-243671, 2000-38531, H2-311569, H3-216379, or WO 99/29787, can be used.

Among them, it is preferable that the ultraviolet ray-curable ink (hereinafter referred to as also merely ink) comprises a photo-cation initiator (a cationic polymerization initiator) and a cationic polymerizable monomer.

Specifically, the ink comprises at least one compound selected from the group consisting of oxetane compounds, epoxy compounds and vinyl ether compounds. More specifically, following compound (cationic polymerizable monomer unit) is listed.

(Oxetane Compound)

The oxetane compounds, which can be used in the present invention, will be described, however, the present invention is not limited to those. The oxetane compound preferably used in the present invention is a compound having the oxetane ring in the molecule, and all publicly known oxetane compounds as described in JP-A No. 2001-220526, or JP-A No. 2001-310937, can be used.

In the compound having the oxetane ring used in the present invention, the compound having 1–4 oxetane rings in the molecule is preferable. When the compound having the oxetane rings of 1 to 4 is used, because the viscosity of the composition can be kept appropriately, the handling becomes not difficult, or the glass transition temperature of the composition can be also maintained properly to use, the coking property of the hardened material becomes sufficient.

As the compound having one oxetane ring, the compound shown by the following General Formula (1) is listed.

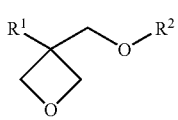

General Formula (1)

In the General Formula (1), $R^1$ is a hydrogen atom, alkyl group having 1–6 carbon atoms such methyl group, ethyl group, propyl group or butyl group, fluoro-alkyl group having 1 to 6 carbon atoms, allyl group, aryl group, furyl group, or thienyl group. $R^2$ is an alkyl group having 1 to 6 carbon atoms such as methyl group, ethyl group, propyl group or butyl group; alkenyl group having 2 to 6 carbon atoms such as 1-propenyl group, 2-propenyl group, 2-methyl-1-propenyl group, 2-methyl-2-propenyl group, 1-butenyl group, 2-butenyl group or 3-butenyl group; a group having aromatic ring such as phenyl group, benzyl group, fluoro-benzyl group, methoxy-benzyl group or phenoxy-ethyl group; alkyl carbonyl group having 2 to 6 carbon atoms such as ethyl carbonyl group, propyl carbonyl group or butyl carbonyl group; alkoxy carbonyl group having 2 to 6 carbon atoms such as ethoxy carbonyl group, propoxy carbonyl group or butoxy carbonyl group; N-alkyl carbamoyl group having 2 to 6 carbon atoms such as ethyl carbamoyl group, propyl carbamoyl group, butyl carbamoyl group or pentyl carbamoyl group. As the oxetane compound used in the present invention, it is particularly preferable that the compound having one oxetane ring is used, because the obtained composition is excellent in the coking property, and the operability is excellent in the low viscosity.

Next, as the compound having two oxetane rings, the compounds shown by the following General Formula (2) are listed.

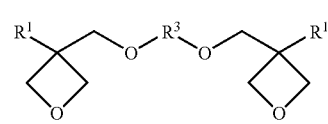

General Formula (2)

In the General Formula (2), $R^1$ is the same group as the group shown in the above-described General Formula (1). $R^3$ is, for example, a linear or branching alkylene group such as ethylene group, propylene group or butylene group; linear or branching poly (alkylene-oxy) group such as poly (ethylene oxy) group or poly (propylene oxy) group; linear or branching un-saturated hydrocarbon group such as propenylene group, methyl propenylene group or butenylene group; carbonyl group; alkylene group including carbonyl group; alkylene group including carboxyl group; alkylene group including carbamoyl group. Further, $R^3$ may also be a polyhydric group selected from the group shown by the following General Formulas (3), (4) and (5).

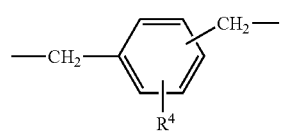

General Formula (3)

In the General Formula (3), $R^4$ is a hydrogen atom, an alkyl group having 1 to 4 carbon atoms such as methyl group, ethyl group, propyl group or butyl group, or alkoxy group having 1 to 4 carbon atoms such as methoxy group, ethoxy group, propoxy group or butoxy group, or halogen atom such as chloride atom or bromine atom, nitro group, cyano group, mercapto group, lower alkyl carboxyl group such as the group having 1 to 5 carbon atoms, carboxyl group, or carbamoyl group.

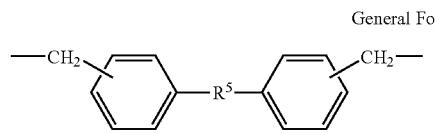

General Formula (4)

In the General Formula (4), $R^5$ is oxygen atom, sulfide atom, methylene group, —NH—, —SO—, —SO$_2$—, —C(CF$_3$)$_2$—, or —C(CH$_3$)$_2$—.

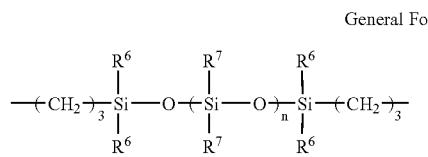

General Formula (5)

In the General Formula (5), $R^6$ is an alkyl group having 1 to 4 carbon atoms such as methyl group, ethyl group, propyl group or butyl group, or aryl group. Numeral n is an integer of 0–2000. $R^7$ is an alkyl group having 1 to 4 carbon atoms such as methyl group, ethyl group, propyl group or butyl group, or aryl group. $R^7$ is also a group selected from the group shown by the following General Formula (6).

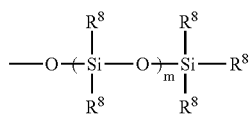

General Formula (6)

In the General Formula (6), $R^8$ is an alkyl group having 1 to 4 carbon atoms such as methyl group, ethyl group, propyl group or butyl group, or aryl group. Numeral m is an integer of 0–100. As a specific example of the compound having 2 oxetane rings, the compounds shown by the following structural formulas are listed.

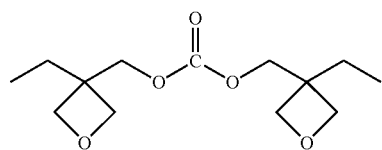

The compound shown by the above structural formula is a compound in which $R^1$ is ethyl group, and $R^3$ is carboxyl group in the General Formula (2).

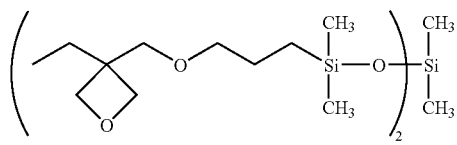

The compound shown by the above structural formula is a compound in which $R^1$ is ethyl group, and $R^3$ is the general formula (5), $R^6$ and $R^7$ is methyl group and n is 1 in the General Formula (2).

Among the compound having 2 oxetane rings, as a preferable example except for the above-described compounds, there are compounds shown by the following General Formula (7). In the General Formula (7), $R^1$ is the same group as in the General Formula (1).

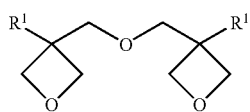

General Formula (7)

As the compounds having 3–4 oxetane rings, the compounds shown in the following General Formula (8) are listed.

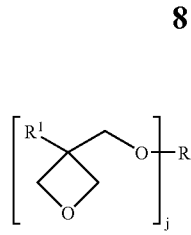

General Formula (8)

In the General Formula (8), $R^1$ is the same group as in the General formula (1). $R^9$ is, for example, branching alkylene group having 1 to 12 carbon atoms such as groups shown by the following General Formulas (9), (10), branching poly (alkylene oxy) group such as group shown by the following General Formula (11), or branching polysiloxane group such as group shown by the following General Formula (12) is listed. Numeral j is 3 or 4.

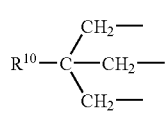

General Formula (9)

In the General Formula (9), $R^{10}$ is a lower alkyl group such as the group having 1 to 5 carbon atoms including methyl group, ethyl group, or propyl group.

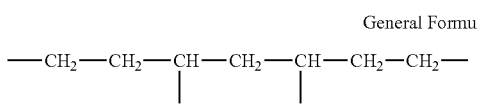

General Formula (10)

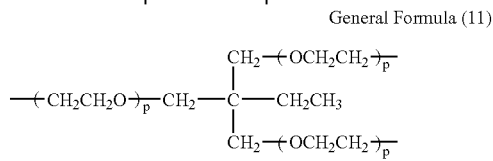

General Formula (11)

In the General Formula (11), numeral p is an integer of 1–10.

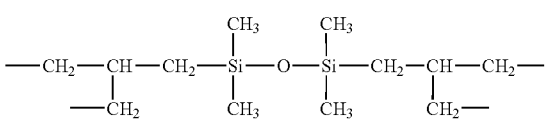

General Formula (12)

As the specific example of the compound having 4 oxetane rings, the compound shown in the following are cited.

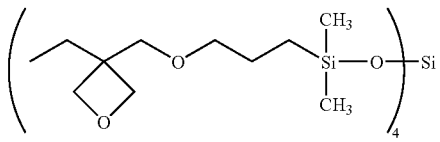

Furthermore, as an example of the compounds having 1–4 oxetane rings except the above examples, there are compounds shown in the following General Formula (13).

General Formula (13)

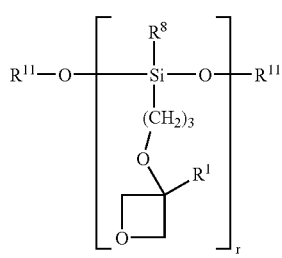

In the General Formula (13), R1 is the same group as in General Formula (1) and $R^8$ is the same group as in the General Formula (6). $R^{11}$ is alkyl group having 1 to 4 carbon atoms such as methyl group, ethyl group, propyl group or butyl group, or tri-alkyl silyl group, and numeral r is 1–4.

As preferable specific examples of the oxetane compounds used in the present invention, there are compounds shown below.

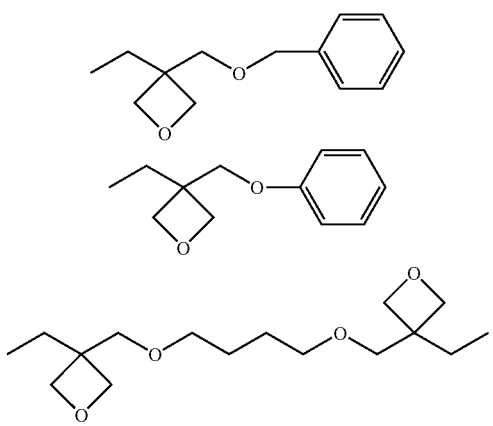

The production method of the compounds having the oxetane ring is not particularly limited, and it may be conducted according to the conventionally known method, and for example, there is a synthetic method of an oxetane ring from diol disclosed by Pattison (D. B. Pattison, J. Am. Chem. Soc., 3455, 79 (1957)).

Further, other than them, compounds having 1–4 oxetane rings, which have high molecular weight of molecular weight of about 1000–5000, are also listed. As an example of them, for example, the following compounds are listed.

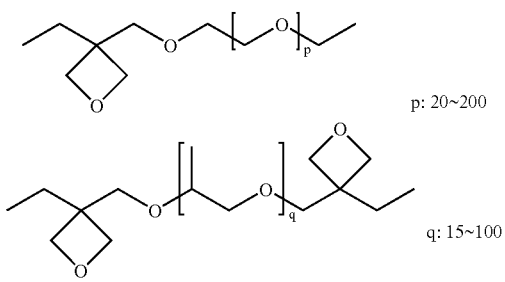

p: 20~200 q: 15~100

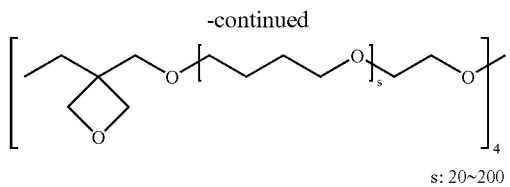

s: 20~200

As a preferable compound in the oxetane compounds, there is a compound having oxetane ring and one hydroxyl group in the molecule, and the compound shown by, for example, the following formula can be listed.

General Formula (14)

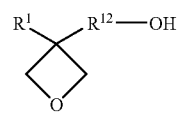

In the General Formula (14), $R^1$ is the same group as in the General Formula (1). $R^{12}$ is an chained or branched alkylene group having 1 to 6 carbon atoms such as methylene, ethylene, propylene or butylene, and this alkylene group may also be a group having the ether binding, for example, oxy alkylene group such as oxy methylene, oxy ethylene, oxy propylene, or oxy butylene. In these compounds, when the quick hardenability, adhesion, and surface hardness are considered, as $R^1$ and $R^{12}$, the alkyl group having 1 to 6 carbon atoms is preferable, and particularly the alkyl group having 1 to 3 carbon atoms is preferable.

As a specific examples of the compounds expressed by the General Formula (14), 3-hydroxy methyl-3-methyl oxetane, 3-hydroxy methyl-3-ethyl oxetane, 3-hydroxy methyl-3-propyl oxetane, 3-hydroxy methyl-3-normal butyl oxetane, 3-hydroxy methyl-3-phenyl oxetane, 3-hydroxy methyl-3-benzyl oxetane, 3-hydroxy ethyl-3-methyl oxetane, 3-hydroxy ethyl-3-ethyl oxetane, 3-hydroxy ethyl-3-propyl oxetane, 3-hydroxy ethyl-3-phenyl oxetane, 3-hydroxy propyl-3-methyl oxetane, 3-hydroxy propyl-3-methyl oxetane, 3-hydroxy propyl-3-ethyl oxetane, 3-hydroxy propyl-3-propyl oxetane, 3-hydroxy propyl-3-phenyl oxetane, and 3-hydroxy butyl-3-methyl oxetane, can be exemplified. In these compounds, from the easiness of obtaining, as oxetane mono-alcohol compound, 3-hydroxy methyl-3-methyl oxetane and 3-hydroxy methyl-3-ethyl oxetane are preferable.

(Epoxy Compound)

As the epoxy compounds, which are preferably used in the present invention, all publicly known epoxy compounds such as disclosed in JP-A Nos. 2001-55507, 2001-31892, 2001-40068, or 2001-310938, can be used.

As aromatic epoxide, preferable one is di- or polyglycidyl ether, which is synthesized by the reaction of polyhydric phenol having at least one aromatic core or alkylene oxide-added polyhydric phenol and epichlorohydrin, and for example, di- or poly-glycidyl ether of bisphenol A or of alkylene oxide-added bisphenol A, di- or polyglycidyl ether of hydrogenated bisphenol A or of alkylene oxide-added hydrogenated bisphenol A, and novolak type epoxy resin, are listed. Herein, as alkylene oxide, ethylene oxide and propylene oxide are listed.

As alicyclic epoxide, a cyclohexene oxide or cyclopentene oxide, which is obtained by epoxidation of the compound having cycloalkane ring such as at least one cyclohexene or cyclopentene ring by the appropriate oxidant such as hydrogen peroxide or peracid, is preferable.

As a preferable aliphatic epoxide, there is di- or polyglycidyl ether of aliphatic polyvalent alcohol or of alkylene oxide-added aliphatic polyvalent alcohol, and as its representative example, di-glycidyl ether of alkylene glycol such as di-glycidyl ether of ethylene glycol, di-glycidyl ether of propylene glycol and glycidyl ether of 1,6-hexane diol, poly-glycidyl ether of polyvalent alcohol such as di-or tri-glycidyl ether of glycerin or of alkylene oxide added glycerin, and di-glycidyl ether of polyalkylene glycol such as di-glycidyl ether of polyethylene glycol or of alkylene oxide-added polyethylene glycol, and di-glycidyl ether of polypropylene glycol or of alkylene oxide-added polypropylene glycol, are listed. Herein, as alkylene oxide, ethylene oxide and propylene oxide are listed.

In these epoxides, when the quick hardening ability is considered, aromatic epoxide and alicyclic epoxide are preferable, and particularly, alicyclic epoxide is preferable. In the present invention, on kind of the above epoxides may be solely used, and more than 2 kinds of them may also be used by appropriately being combined.

(Vinyl Ether Compound)

Also as a vinyl ether compound preferably used in the ink of the present invention, publicly known vinyl ether compounds can be used, and for example, di or tri-vinyl ether compound, such as ethylene glycol di-vinyl ether, di-ethylene glycol di-vinyl ether, tri-ethylene glycol di-vinyl ether, propylene glycol di-vinyl ether, di-propylene glycol di-vinyl ether, butane diol di-vinyl ether, hexane diol di-vinyl ether, cyclohexane di-methanol di-vinyl ether, tri-methylol propane tri-vinyl ether, or mono vinyl ether compound, such as ethyl vinyl ether, n-butyl vinyl ether, iso-butyl vinyl ether, octadecyl vinyl ether, cyclohexyl vinyl ether, hydroxy butyl vinyl ether, 2-ethyl-hexyl vinyl ether, cyclo-hexane di-methanol mono-vinyl ether, n-propyl vinyl ether, iso-propyl vinyl ether, iso-propenyl ether-o-propylene carbonate, dodecyl vinyl ether, or di-ethylene glycol mono vinyl ether vinyl ether, is listed.

In these vinyl ether compounds, when the hardenability, adhesion or surface hardness is considered, di or tri-vinyl ether compound is preferable, and particularly di-vinyl ether compound is preferable. In the present invention, one kind of the above vinyl ether compounds may also be used, and more than two kinds of them may also be used by being appropriately combined.

As the photo initiator, all publicly known photo acid generators (a compound which generates the acid by the active ray, such as ultraviolet rays) can be used. As the photo acid generator, for example, a chemical amplification type photo resist or compound used for the light cationic polymerization is used (Organic electronics material seminar "Organic material for imaging" from Bunshin publishing house (1993), refer to page 187–192). Examples preferable for the present invention will be listed below. Firstly, aromatic onium compound $B(C_6F_5)_4^-$, $PF_6^-$, $AsF_6^-$, $SbF_6^-$, $CF_3SO_3^-$ salt, such as diazonium, ammonium, iodonium, sulfonium, phosphonium, can be listed. Specific examples of the onium compounds will be shown below.

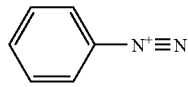
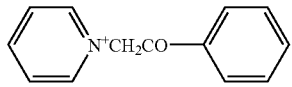

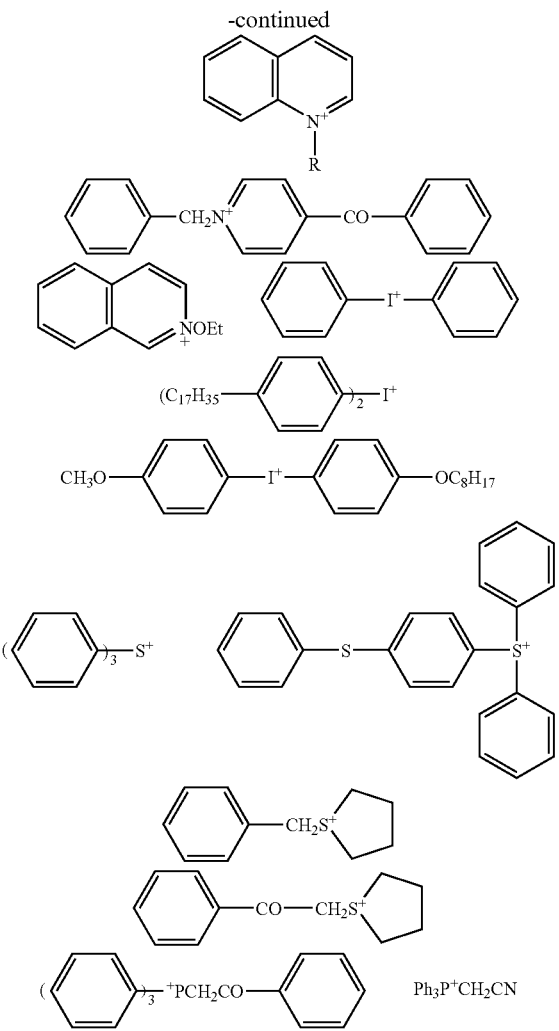

Secondly, sulfone compounds, which generate sulfonic acid, can be listed. Examples of specific compounds will be shown below.

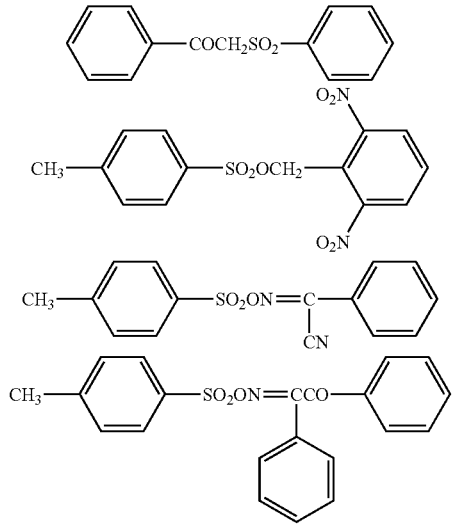

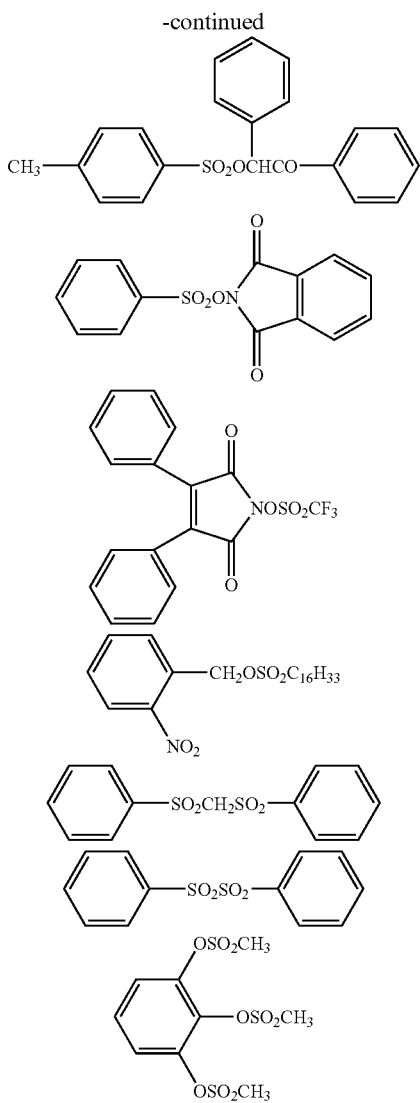

Thirdly, halogenide which generates hydrogen halide can also be used. Examples of specific compounds will be shown below.

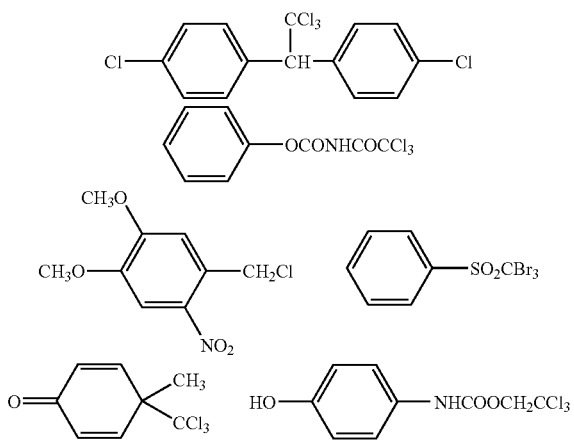

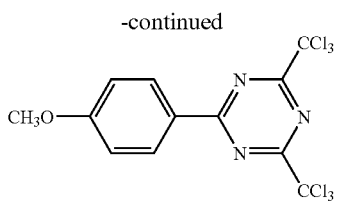

Fourthly, ferrite allene complex can be listed.

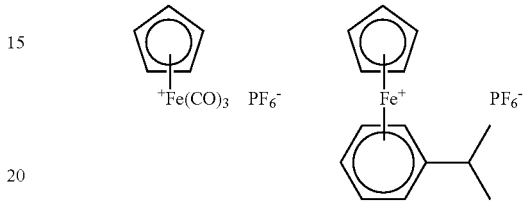

As the ink usable in the present invention, it is preferable that an acid breeding agent, which newly generates the acid by the acid generated by the irradiation of the ultraviolet ray which is already publicly known, commencing with JP-A Nos. H8-248561, and H9-034106, is included. By using the acid breeding agent, the more increase of jetting stability, decrease of curl and wrinkle of the recording material are made possible.

Other than above, when the ink component materials are colored, colorants can be added. As the colorants, the colorants, which can be solved or dispersed in main component of the polymeric compound, can be used, however, from the viewpoint of weather fastness, the pigment is preferable. As the pigment, the followings can be used, however, it is not limited to these.

C. I. Pigment Yellow-1, 3, 12, 13, 14, 17, 81, 83, 87, 95, 109, 42,

C. I. Pigment Orange-16, 36, 38,

C. I. Pigment Red-5, 22, 38, 48:1, 48:2, 48:4, 49:1, 53:1, 57:1, 63:1, 144, 146, 185, 101, C. I. Pigment Violet-19, 23, C. I. Pigment Blue-15:1, 15:3, 15:4, 18, 60, 27, 29, C. I. Pigment Green-7, 36

C. I. Pigment White-6, 18, 21,

C. I. Pigment Black-7.

Further, in the present invention, in order to increase the screening property of the color in the transparent recording substrate such as the plastic film, it is preferable that the white ink is used. Particularly, in the soft packing print, and label print, the white ink is essential, but because the jetting amount is large, the problem of the above-described jetting stability and curl and wrinkle of the recording material becomes conspicuous.

To disperse the pigment, a ball mill, sand mill, attritor, roll mill, agitator, Henschel mixer, colloid mill, ultrasonic homogenizer, Pearl mill, wet jet mill, or paint shaker may be used. Further, when the pigment is dispersed, the dispersing agent can also be added. It is preferable that, as the dispersing agent, high polymeric dispersing agent is used. As the high polymeric dispersing agent, Solsperse series of Avecia co., is cited.

Further, as the dispersion auxiliary agent, the synergist corresponding to each kind of pigment can also be used. It is preferable that 1–50 parts by weight of these dispersing agent and dispersion auxiliary agent are added to 100 parts by weight of the pigment. The dispersion medium is solvent or polymeric compound, and it is preferable that the ultraviolet ray-curable ink used in the present invention comprises no-solvent, because it is reacted and hardened just after the arrival of the ink. When the solvent remains in the hardened image, the problem of deterioration of solvent resistance and VOC (Volatile Organic Compound) of the remained solvent is raised. Accordingly, it is preferable in the dispersion aptitude that the dispersion medium is not solvent, but polymeric compounds, and the monomer in which the viscosity is lowest in them, is selected.

When the dispersion is conducted, it is preferable to configure the pigment, dispersing agent, selection of diluent for the dispersion so that average particle size of the pigment become 0.08–0.5 µm, more preferably 0.3–10 µm, still more preferably, 0.3–3 µm. By this particle size control, the nozzle plugging of the inkjet head is suppressed, and the preservation stability of the ink, ink transparency and hardening sensitivity can be maintained.

It is preferable for the colorant that the addition amount is 1 weight % to 10 weight % of the whole of the ink.

(The Other Components)

In order to increase the keeping quality of the ink components, the polymerization inhibitor of 200–20000 ppm can be added. Because it is preferable that the ultraviolet ray-curable ink is heated and made to low viscosity, and jetted, it is preferable for preventing the head from plugging by the thermal polymerization that the polymerization inhibitor is added. As the polymerization inhibitor, for example, a basic compound can be added.

Other than that, corresponding to the necessity, the surfactant, leveling additive agent, mat agent, polyester resin for adjusting the film property, polyurethane resin, vinyl resin, acrylic resin, rubber resin, or wax can be added. In order to improve the adhesion to the recording medium, it is also effective that the very fine amount of organic solvent is added. In this case, the addition within the range that the problem of the solvent resistance or VOC is not generated, is effective, and the amount is 0.1–5 weight %, preferably 0.1–3 weight % of total ink weight.

Further, it is also possible that the radical polymerizable monomer and the initiator are combined, and the hybrid type hardening ink of the radical and cation is made.

EXAMPLES

The present invention will be more specifically described by Examples below, however, the present invention is not limited to them.

Ink-Jet Head and Ink-Jet Printer Engine

FIG. 1 is a structural sectional view of an ink-jet head, which is an example of the ink-jet printer, for which the ultraviolet ray-curable ink can be used.

In the ink supply system, the ink is supplied from an ink supply pipe 5 to the piezoelectric type ink-jet head 19 through an unillustrated source tank, supply piping and filter.

In the FIG. 1, numeral 1 is a substrate, numeral 2 is a piezoelectric element, numeral 3 is a passage plate, numeral 3a is an ink passage, numeral 4 is an ink supply tank, numeral 4a is an ink chamber, numeral 5 is an ink supply pipe, numeral 6 is a nozzle plate, numeral 6a is a nozzle, numeral 7 is a drive circuit printed board, numeral 8 is a lead wire, numeral 9 is a drive electrode, numeral 11 is a protection plate, numeral 16 is a heater, numeral 17 is a heater power source, and numeral 18 is a heat transfer member, and an ink-jet head 19 having them is shown.

For the inkjet head portion, heat was insulated and added by the heater 16. The temperature sensors were respectively provided near the ink supply tank and nozzle of the inkjet head, and the temperature control was conducted so that the nozzle portion was always the setting temperature ±2° C. The pitch of nozzle was 300 dpi (dpi expresses the number of dots per 2.54 cm), and 512 nozzles were provided per one head. In order to obtain the liquid drop amounts and film thickness written in the Table, the nozzle diameter was adjusted to 10–30 µm, the jetting temperature was adjusted to 20–150° C., and the drive voltage was adjusted within the range of 5–30 V, and the ink was jetted. The recording density was 600 dpi.

Figure 2:
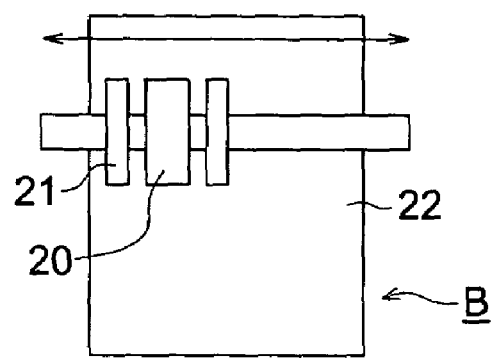
FIG. 2(a) and FIG. 2(b) each is an outline structural view of an ink-jet printer in which the ink-jet head and the ultraviolet ray-emitting light source are arranged.
Figure 2:
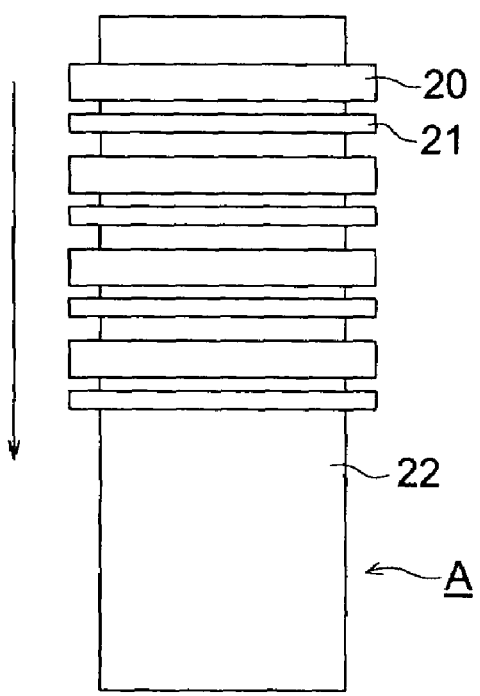

FIG. 2(a) and FIG. 2(b) shows an outline structural views of the ink-jet printers in which has the ink-jet head and the ultraviolet ray emitting light source is arranged.

In the FIGS. 2(a) and 2(b), the numeral 20 is the ink-jet head, the numeral 21 is the light source and the numeral 22 is the recording substrate. FIG. 2(a) shows a capstan B, and FIG. 2(b) shows a line printer A.

(Preparing the Ink for Ink-Jet)

The Production of the Ink Set A

The ink set A of yellow (Y), magenta (M), cyan (C), and black (K) was produced by the composition shown in Table 1 (part by weight of each ink is shown).

TABLE 1

| | | Ink set A | | | | |
|---|---|---|---|---|---|---|
| Material<br>Colorant<br>Amount of colorant | | K<br>CI pigment<br>Black 7<br>5.0 | C<br>CI pigment<br>Blue 15:3<br>2.5 | M<br>CI pigment<br>Red 57:1<br>3.0 | Y<br>CI pigment<br>Yellow 13<br>2.5 | Note |
| Photo<br>polymerizable<br>compound | OXT-222<br>(TOAGOUSEI Co.,) | 51.0 | 58.5 | 58.0 | 58.5 | Oxetane<br>compound |
| Photo<br>polymerizable<br>compound | CELOXIDE<br>2021P (DAICEL CHEMICAL<br>INDUSTRIES Co., LTD) | 20.0 | 20.0 | 20.0 | 20.0 | Epoxy<br>compound |

TABLE 1-continued

|  |  | Ink set A | | | | |
|---|---|---|---|---|---|---|
| | | K | C | M | Y | |
| Material | | CI pigment | CI pigment | CI pigment | CI pigment | |
| Colorant | | Black 7 | Blue 15:3 | Red 57:1 | Yellow 13 | |
| Amount of colorant | | 5.0 | 2.5 | 3.0 | 2.5 | Note |
| Photo polymerizable compound | GT403 (DAICEL CHEMICAL INDUSTRIES Co., LTD) | 15.0 | 10.0 | 10.0 | 10.0 | Vinyl ether compound |
| Acid breeding agent | ACPRESS 11M (NIPPON CHEMIX Co.,) | 3.0 | 3.0 | 3.0 | 3.0 | |
| Initiator | MPI103 (MIDORI CHEMISTRY Co.,) | 5.0 | 5.0 | 5.0 | 5.0 | Cation polymerization |
| Initiator auxiliary agent | Diethyl oxisanton | 1.0 | 1.0 | 1.0 | 1.0 | |

The Production of the Ink Set B

The ink set B of yellow (Y), magenta (M), cyan (C), and black (K) was position shown in Table 2 (part by weight of each ink is shown).

TABLE 2

|  |  | Ink set B | | | | |
|---|---|---|---|---|---|---|
| | | K | C | M | Y | |
| Material | | CI pigment | CI pigment | CI pigment | CI pigment | |
| Colorant | | Black 7 | Blue 15:3 | Red 57:1 | Yellow 12 | |
| Amount of colorant | | 3.0 | 3.0 | 3.0 | 2.0 | Note |
| High molecular dispersing agent | Solsperse (ZENECA Co.) | 1.0 | 1.0 | 1.0 | 1.0 | |
| Photo polymerizable compound | Stearyl acrylate | 76.0 | 76.0 | 76.0 | 77.0 | Acrylic compound |
| Photo polymerizable compound | Tetra ethylene glycol di-acrylate (2 functions) | 10.0 | 10.0 | 10.0 | 10.0 | Acrylic compound |
| Photo polymerizable compound | Caprolactam denaturation di-penta-erythritol hexa-acrylate (6 functions) | 5.0 | 5.0 | 5.0 | 5.0 | Acrylic compound |
| Initiator | Irgacure 184 (CIBA Co.) | 5.0 | 5.0 | 5.0 | 5.0 | Radical polymerization |

Example 1

As the printer, the capstan B shown in FIG. 2(a) and the line printer A shown in FIG. 2(b) was used. As the ink, K (black ink) of the ink sets A and B were used.

(Irradiation Light Source)

Light source A: Ultraviolet fluorescent lamp made by HYBEC. Co.,: main wavelength 365 nm.

Light source B: Ultraviolet fluorescent lamp made by HYBEC. Co.,: main wavelength 254 nm.

Light source C: high pressure mercury lamp made by JAPAN STORAGE BATTERY Co., LTD.: 80 W/cm Substrate OPS: DXL film 219V-01 made by MITSUBISHI PLASTIC, INC.

Other experimental conditions are described in the following Table 3.

Shrinkage of the recording substrate and Occasion of band-form unevenness of images recorded in the conditions described in the Table 3 were evaluated.

<Evaluation>

(Shrinkage of the Recording Substrate)

Degree of the shrinkage of the recording substrate when each of the recording substrate was printed under the condition described in Table 3 was visually observed, and classified into the following classes.

A: Shrinkage of the recording substrate was not observed at all

B: Shrinkage of the recording substrate was observed slightly

C: Terrible shrinkage of the recording substrate was observed (Occasion of Band-Form Unevenness)

Solid image was printed under conditions described in Table 3, and the occasion of band-state unevenness was observed and was classified into the following classes.

A: Band-form unevenness was not observed at all

A': One or two portions of weak band-form unevenness were observed

B: Three of more of weak band-form unevenness were observed

C: Thick band-form unevenness was observed

A, A' or B can be practically used.

The results are shown in the following Table 3.

TABLE 3

| Printer Type | Ink set | Light source | Temperature of the surface of the light source during emitting light (° C.) | Distance between the surface of the light source and the recording substrate (mm) | Timing of emitting light after arrival of the ink on the recording substrate (seconds) | Energy of light emitting of the light source (mj/cm$^2$) | Recording substrate | Evaluating Results Shrink-age | Uneven-ness of solid image | Rmks |
|---|---|---|---|---|---|---|---|---|---|---|
| Capstan B (FIG. 2(a)) | A | A + B | 45 | 1 | 0.05 | 30 | OPS | A | A | Inv. |
| Line printer A (FIG. 2(b)) | A | A + B | 45 | 1 | 0.05 | 30 | OPS | A | A | Inv. |
| Line printer A | B | A + B | 45 | 1 | 0.05 | 70 | OPS | A | A' | Inv. |
| Line printer A | B | C | 120 | 1 | 0.05 | 70 | OPS | C | — (*1) | Com. |
| Line printer A | B | C | 120 | 80 | 1.5 | 70 | OPS | C | C | Com. |

(*1): Solid image could not be obtained due to the terrible shrinkage of the recording substrate As apparent from Table 3, when the ink-jet printing was conducted by the method of the present invention, the shrinkage of the recording substrate and the occasion of band-form unevenness were efficiently inhibited.

Example 2

6 point-Japanese characters in MS Mincho style were printed with utilizing yellow, magenta, cyan and Black inks in an optimized density under the conditions described in the following Table 4. Then, Quality of the printed characters and Occasion of bleeding were evaluated in the following criteria.

(Quality of Printed Characters)

Irregularity of the printed characters was evaluated by visually observation through a magnifier, and was classified into the following classes.

A: Irregularity was not observed at all.
B: Irregularity was observed slightly.
C: Irregularity was observed, but the character could be discriminated (Occasion of Bleeding)

Occasion of bleeding was evaluated by visually observation adjacent dots of each color through a magnifier, and was classified into the following classes.

A: Each adjacent dot kept the circular form and Bleeding was not observed at all
B: Each adjacent dot kept the circular form approximately, and Bleeding was slightly observed
C: The circular form of each adjacent dot deformed, but practically available.

The evaluated results are shown in following Table 4.

TABLE 4

| Printer Type | Ink set | Light source | Temperature of the surface of the light source during emitting light (° C.) | Distance between the surface of the light source and the recording substrate (mm) | Timing of emitting light after arrival of the ink on the recording substrate (seconds) | Energy of light emitting of the light source (mj/cm$^2$) | Recording substrate | Evaluating Results Quality of character | Occasion of bleeding | Rmks |
|---|---|---|---|---|---|---|---|---|---|---|
| Line printer A (FIG. 2(b)) | A | A | 45 | 1 | 0.05 | 30 | OPS | B | A | Inv. |
| Line printer A | A | A | 45 | 1 | 0.5 | 30 | OPS | A | B | Inv. |
| Line printer A | A | A | 45 | 1 | 0.9 | 30 | OPS | A | B | Inv. |
| Line printer A | A | A | 45 | 1 | 1.2 | 30 | OPS | B | C | Inv. |
| Line printer A | A | A | 45 | 1 | 1.5 | 30 | OPS | C | C | Inv. |
| Line printer A | B | A | 45 | 1 | 0.05 | 70 | OPS | B | A | Inv. |
| Line printer A | B | A | 45 | 1 | 0.5 | 70 | OPS | B | B | Inv. |
| Line printer A | B | A | 45 | 1 | 0.9 | 70 | OPS | B | B | Inv. |
| Line printer A | B | A | 45 | 1 | 1.2 | 70 | OPS | B | C | Inv. |
| Line printer A | B | A | 45 | 1 | 1.5 | 70 | OPS | C | C | Inv. |

As apparent from Table 4, the character images obtained by utilizing the printing method satisfying preferable structure of the present invention showed excellent image quality and image stability.

EFFECTS OF THE INVENTION

As is apparent from the foregoing, a ink-jet image forming method which provides high quality and excellent in inhibit shrinkage of the recording substrate, occasion of band-form unevenness and bleeding of character image and in image quality, can be provided.

What is claimed is:

1. An ink-jet image forming method comprising:
   jetting ultraviolet ray-curable ink from an ink-jet head onto a recording substrate while conveying the recording substrate; and
   exposing the jetted ink on the recording substrate to ultraviolet rays irradiated by an ultraviolet ray-emitting light source within 0.0005 to 1 second after the arrival of the jetted ultraviolet ray-curable ink to the recording substrate on condition that the distance between a surface of the ultraviolet ray-emitting light source and the recording substrate is from 0.1 mm to 100 mm,
   wherein in the exposing step, a surface temperature of the ultraviolet ray-emitting light source is not more than 60° C.

2. The inkjet image forming method of claim 1, wherein the ink-jet head is a line-shape ink-jet head installed in a perpendicular direction to a conveying direction of the recording substrate, and the ultraviolet ray-emitting light source is a ultraviolet ray-emitting tube, which is longer than the line-shape ink-jet head, and is fixed at a downstream position of the ink-jet head and in the perpendicular direction of the conveying direction of the recording substrate.

3. The ink-jet image forming method of claim 1, wherein the ultraviolet ray-curable ink is jetted onto the recording substrate while the ink-jet head being moved by a carriage in a perpendicular direction of the conveying direction of the recording substrate, and the ultraviolet ray-emitting light source is installed on the carriage.

4. The image forming method of claim 1, wherein the exposing step is started in at most 1 second after an arrival of the jetted ultraviolet ray-curable ink to the recording substrate.

5. The image forming method of claim 1, wherein the ultraviolet ray-emitting light source is a fluorescent light source comprising a fluorescent material.

6. The image forming method of claim 1, wherein plural ultraviolet ray-emitting light sources, which have different peak wavelengths from each other, are used in the exposing step.

7. The image forming method of claim 1, wherein the ultraviolet ray-curable ink comprises a cationic polymerization initiator and a cationic polymerizable monomer.

* * * * *